United States Patent [19]

Köhler et al.

[11] 4,409,187

[45] Oct. 11, 1983

[54] SEALING AGENT AND LUBRICANT FOR MEDIUM-PRESSURE AND HIGH-PRESSURE AUTOCLAVES

[75] Inventors: Armin Köhler, Dormagen; Herbert Schuster, Cologne; Rudi Renner, Bergisch-Gladbach, all of Fed. Rep. of Germany

[73] Assignee: Bayer Aktiengesellschaft, Leverkusen, Fed. Rep. of Germany

[21] Appl. No.: 241,148

[22] Filed: Mar. 6, 1981

[30] Foreign Application Priority Data

Mar. 22, 1980 [DE] Fed. Rep. of Germany ....... 3011083

[51] Int. Cl.$^3$ .......................... B01J 3/00; C10M 3/16
[52] U.S. Cl. ................ 422/135; 252/51.5 R; 252/52 A
[58] Field of Search .............. 252/51.5 R, 52 A; 422/135, 242; 366/241

[56] References Cited

U.S. PATENT DOCUMENTS 1,959,930  5/1934  Schmidt et al. ............. 252/52 A X

FOREIGN PATENT DOCUMENTS 2241242  3/1974  Fed. Rep. of Germany .

*Primary Examiner*—Thomas A. Waltz
*Attorney, Agent, or Firm*—Sprung, Horn, Kramer & Woods

[57] ABSTRACT

In an autoclave containing a sealing agent and/or lubricant the improvement wherein said sealing agent or lubricant is a polyether-polyol which has an average OH-functionality of 5.0 to 7.0 and an average OH number of 250 to 500 prepared by reacting a mixture of sucrose and at least one other starting molecule chosen from the group comprising
(a) polyhydric alcohols with an OH-functionality of less than 8,
(b) monoamines or polyamines which contain at least 2 hydrogen atoms bonded to the amino nitrogen and
(c) water, with ethylene oxide and/or propylene oxide.

6 Claims, No Drawings

SEALING AGENT AND LUBRICANT FOR MEDIUM-PRESSURE AND HIGH-PRESSURE AUTOCLAVES

The invention relates to a sealing agent and lubricant for medium-pressure and high-pressure autoclaves which contain polyether-polyols.

It is known that, in chemical reactions which are carried out under pressure in a stirred autoclave, such as the polymerization of ethylene or the polymerisation of ethylene with vinyl acetate, the seal between the moving stirrer and the fixedly installed autoclave jacket presents a considerable problem.

It is also important that the stirred autoclave is not only sealed but that, in addition, the friction, which is caused by the moving stirrer and which leads to severe wear of material, is reduced.

The stirrer guide in the autoclave, the so-called stuffing box, thus contains several sealing rings of weldless soft iron, which must be more or less firmly tightened, for sealing the medium under pressure in the autoclave. In order to reduce the friction of the moving stirrer in the autoclave and for additional sealing, a sealing agent, which must also simultaneously be a good lubricant, is pressed between the stirrer and the stuffing box. Entry of some of the sealing agent and lubricant inside the autoclave and emergence of a further portion out of the top of the stuffing box cannot be avoided. The quality of the sealing agent and lubricant is assessed from whether the soft iron rings need very little re-tightening, which means low wear and hence a good lubricating action, whether very little sealing agent and lubricant flows into the autoclave or emerges out of the top of the stuffing box and is hence lost, which argues for the economy of the sealing agent and lubricant in use, and whether the sealing agent and lubricant seals the stirred autoclave sufficiently.

Since the sealing agent and lubricant can also enter inside the autoclave, as described above, it is particularly important that the sealing agent and lubricant is inert, that is to say it should not interfere with the reaction taking place in the autoclave or discolour the product or influence the product in any other way.

It has been found, however, especially in the case of reactions which are sensitive to foreign substances, such as polymerization of ethylene with vinyl acetate under pressure, that the known mineral oils and other customary lubricants, such as Energol ®, Mobil ® oil or glycerol cannot be used, since these interfere considerably with the reaction in the autoclave and/or discolour the product.

A sealing agent and lubricant has now been found which contains polyether-polyols which have an average OH-functionality of 5.0 to 7.0 and an average OH number of 250 to 500 and are obtainable by reacting a mixture of sucrose and at least one other starting molecule chosen from the group comprising (a) polyhydric alcohols with an OH-functionality of less than 8, (b) monoamines or polyamines which contain at least two hydrogen atoms bonded to the amino nitrogen and (c) water, with ethylene oxide and/or propylene oxide.

A sealing agent and lubricant of this type which contains polyether-polyols with an average OH-functionality of 5.5 to 6 and a OH number of 350 to 400 is preferred.

The sealing agent and lubricant containing polyether-polyols can particularly advantageously be used for sealing and lubricating medium-pressure and high-pressure autoclaves.

For example, the sealing agent and lubricant according to the invention can be used in the case of polymerization of ethylene with vinyl acetate, which is carried out under pressure of about 100 to about 500 bars in a pressure autoclave and which reacts particularly sensitively to foreign substances. The sealing agent and lubricant according to the invention has the advantage that it does not interfere with the polymerization and also does not affect the quality of the product.

It is also possible to use the sealing agent and lubricant according to the invention with other pressure reactions which are carried out in a medium-pressure or high-pressure autoclave, as long as the sealing agent and lubricant according to the invention is inert towards the reaction taking place in the autoclave.

The sealing agent and lubricant according to the invention can be prepared, as described in DE-OS (German Offenlegungsschrift No. 2,241,242, by first preparing a mixture which contains (a) 100 parts by weight of sucrose, (b) 2 to 5 parts by weight of water, (c) 2 to 20 parts by weight of a polyhydric alcohol with an OH-functionality of less than 8 and/or a monoamine or polyamine containing at least two hydrogen atoms bonded to the amino nitrogen, (d) 40 to 150 parts by weight of an aromatic hydrocarbon solvent and (e) 1 to 5 parts by weight of an alkali metal hydroxide, at 20° to 110° C., and then reacting the mixture with ethylene oxide and/or propylene oxide at 85° to 130° C., under pressure of 0.3 to 4.0 bars.

As polyhydric alcohols with an OH-functionality of less than 8 or as monoamines or polyamines containing at least two hydrogen atoms bonded to the amino nitrogen there may be mentioned: ethylene glycol, propylene glycol, 1,4-butanediol, diethylene glycol, dipropylene glycol, trimethylolpropane, glycerol, sorbitol, mannitol, mono-, di- and tri-ethanolamine, mono-, di- and tri-isopropanolamine, N-alkylalkanolamines, such as N-methyldiethanolamine and N-ethyl-di-ethanolamine, lower aliphatic monoalkylamines, cycloalkylamines, alkylenediamines, such as ethylenediamine, and polyalkylene polyamines, such as diethylenediamine and triethylenetetramine.

Aromatic hydrocarbon solvents which can be employed in the preparation of the sealing agent and lubricant according to the invention are benzene, toluene, ethylbenzene, xylenes and/or chlorobenzene, preferably toluene.

The viscosity of the sealing agent and lubricant according to the invention is 3 to 22 Pas, preferably 6 to 20 Pas, at 25° C.

The viscosity of the sealing agent and lubricant according to the invention can be changed, above all, by varying the hydroxyl number and can be adapted for the particular intended use.

The molecular weight of the sealing agent and lubricant according to the invention is 600 to 12,000, preferably 700 to 2,000, determined by calculation.

As mentioned, the sealing agent and lubricant according to the invention is advantageously employed for sealing and lubricating medium-pressure and high-pressure stirred autoclaves.

The use in the case of reactions in an autoclave which are carried out under pressures of 100 to 500 bars, preferably under 120 to 400 bars, and at temperatures of 50° to 140° C., preferably at 60° to 120° C., is particularly advantageous.

The particular advantages of the sealing agent and lubricant according to the invention are the low consumption, which, together with the low preparation costs, improve the economy in use of the sealing agent and lubricant according to the invention, and the very good lubricating ability, which leads to low wear and a long life of the sensitive stuffing box of the autoclave.

EXAMPLE 1

Ethylene and vinyl acetate are polymerized in a high-pressure autoclave under 350 bars and at 80° C. The speed of the stirrer in the autoclave is 80 revolutions/minute.

A polyether-polyol with an average OH-functionality of 5.5 and an OH number of 390 is forced into the stuffing box under a pressure of 399 bars as a sealing agent and lubricant for the stuffing box.

The consumption of the sealing agent and lubricant is 1 kg over a period of 24 hours. The sealing rings of the stuffing box must be re-tightened four times per month.

The sealing rings were worn out and had to be replaced only after 25 months.

COMPARISON EXAMPLE

Hexanetriol (viscosity: 2.8 Pas at 25° C.) is employed as a sealing agent and lubricant for the stuffing box in the polymerization of ethylene and vinyl acetate according to Example 1.

The consumption of the sealing agent and lubricant is 2.8 to 3.0 kg over a period of 24 hours.

The sealing rings of the stuffing box had to be re-tightened twice daily. After 6 months, the sealing rings were worn out and had to be replaced.

REMARKS

The OH number was obtained in the customary manner by acylation of the polyether with excess phthalic anhydride in pyridine.

The average OH-functionality corresponds to the average functionality of the starting mixture employed in the alkoxylation reaction.

Average OH-functionality =

$$\frac{\text{average Molecular weight of the starting mixture}}{\text{average Equivalent weight of the starting mixture}}$$

What is claimed is:

1. In an autoclave containing a stuffing box, which stuffing box contains a sealing agent and/or lubricant the improvement wherein said sealing agent or lubricant is a polyether-polyol which has an average OH-functionality of 5.0 to 7.0 and an average OH number of 250 to 500 and a molecular weight of 600 to 12,000 and a viscosity of 3 to 22 Pas at 25° C. prepared by reacting a mixture of sucrose and at least one other starting molecule chosen from the group comprising:
   (a) polyhydric alcohols with an OH-functionality of less than 8,
   (b) monoamines or polyamines which contain at least 2 hydrogen atoms bonded to the amino nitrogen and
   (c) water, with ethylene oxide and/or propylene oxide.

2. An autoclave according to claim 1, wherein said autoclave is a medium-pressure and high-pressure autoclave.

3. An autoclave according to claim 1, wherein said sealing agent or lubricant is a polyetherpolyol prepared by forming a mixture at 20° to 110° C. which contains:
   (a) 100 parts by weight of sucrose;
   (b) 2 to 5 parts by weight of water;
   (c) 2 to 20 parts by weight of a polyhydric alcohol with an OH functionality of less than 8 and/or a monoamine or polyalkylene polyamine or alkylenediamine containing at least 2 hydrogen atoms bonded to the amino nitrogen;
   (d) 40 to 150 parts by weight of an aromatic hydrocarbon solvent; and
   (e) 1 to 5 parts by weight of an alkali metal hydroxide and thereafter reacting said mixture with ethylene oxide and/or propylene oxide at 85° to 130° C. under a pressure of 0.3 to 4.0 bars.

4. An autoclave according to claim 3, wherein said polyether polyol is prepared using in the reaction a polyhydric alcohol, said polyhydric alcohol being selected from the group consisting of ethylene glycol, propylene glycol, 1,4-butanediol, diethylene glycol, dipropylene glycol, trimethylolpropane, glycerol, sorbitol, mannitol, monoethanolamine, diethanolamine, triethanolamine, monoisopropanolamine, diisopropanolamine, triisopropanolamine, and N-alkylalkanolamine.

5. A lubricant according to claim 3, wherein said polyether polyol is one prepared by using a monoamine and said monoamine is a lower aliphatic monoalkyl amine or cycloalkyl amine.

6. An autoclave according to claim 3 wherein said polyether polyol is obtained by reacting a polyalkylene polyamine.

* * * * *